United States Patent [19]

Sundholm

[11] 3,725,354

[45] Apr. 3, 1973

[54] USE OF MIXED POLYAMINES FORMED BY THE ACID-CATALYZED CONDENSATION OF AN N-ALKYLANILINE, 2-CHLOROANILINE, AND FORMALDEHYDE AS CURING AGENTS FOR POLYURETHANES

[75] Inventor: Norman K. Sundholm, Middlebury, Conn.

[73] Assignee: Uniroyal, Inc., New York, N.Y.

[22] Filed: June 23, 1971

[21] Appl. No.: 156,021

Related U.S. Application Data

[62] Division of Ser. No. 796,549, Feb. 4, 1969, abandoned.

[52] U.S. Cl......260/75 NH, 252/182, 260/77.5 AM, 260/570 D
[51] Int. Cl. ..............................................C08g 22/16
[58] Field of Search..................260/75 NH, 77.5 AM

[56] References Cited

UNITED STATES PATENTS

| | | |
|---|---|---|
| 3,379,691 | 4/1968 | Sundholm ..............................260/75 |
| 3,412,071 | 11/1968 | Sundholm ..............................260/75 |
| 3,012,008 | 12/1961 | Lister ......................................260/75 |
| 3,097,191 | 7/1963 | France et al..........................260/77.5 |
| 3,277,173 | 10/1966 | Powers et al. .........................260/570 |
| 3,297,758 | 1/1967 | Hoeschele .............................260/570 |
| 3,408,301 | 10/1968 | Sundholm ............................252/182 |

*Primary Examiner*—M. J. Welsh
*Assistant Examiner*—H. S. Cockeram
*Attorney*—James J. Long

[57] ABSTRACT

The mixtures of polyamines formed by the acid-catalyzed condensation of an N-alkylaniline, 2-chloroaniline, and formaldehyde in certain ratios have improved properties for curing polyurethanes. They are readily blended with the liquid polyurethane because they are liquid or have low solidification points.

The properties of the cured polymer can be varied by selecting the proper curing agent, that is, those richer in N-alkylaniline providing softer products, or those richer in 2-chloroaniline providing harder products.

5 Claims, No Drawings

USE OF MIXED POLYAMINES FORMED BY THE ACID-CATALYZED CONDENSATION OF AN N-ALKYLANILINE, 2-CHLOROANILINE, AND FORMALDEHYDE AS CURING AGENTS FOR POLYURETHANES

This application is a division of my co-pending application Ser. No. 796,549, filed Feb. 4, 1969, now abandoned.

The use of 4,4'-methylenebis(2-chloroaniline), called "MOCA," as a curing agent for polyurethanes is well known, but unfortunately this substance is high melting and involves certain processing disadvantages.

Mixed diamine curing agents for polyurethanes are known, as disclosed for example in U.S. Pat. No. 3,194,793 issued to Kogon (assigned to du Pont) on July 13, 1965, which shows mixtures of at least one aromatic primary diamine and at least one aromatic secondary diamine whose secondary amino groups have one valence of each nitrogen atom attached to an aromatic ring and another valence attached to an aliphatic carbon atom. My compositions are also mixtures of two such diamines along with a diamine in which one amino group is primary and the other secondary. It is due to the presence of this novel mixed primary-secondary diamine that my products have superior physical properties.

U. S. Pat. No. 3,285,879 issued to Larson and Hayes (assigned to Universal Oil Products) on Nov. 15, 1966 discloses N-monoalkyl-aromatic diamines as curing agents for polyurethanes. These give soft cured stocks which are of value for certain applications: matting, safety cushioning, etc. My compositions give hard or soft cured stocks depending on the ratio of reactants from which they are made.

My U. S. Pat. No. 3,412,071, issued Nov. 19, 1968, discloses mixed diamine curing agents for polyurethanes formed by acid-catalyzed condensation of aniline, 2-chloroaniline, and formaldehyde. The present products differ from these in that an N-alkylaniline is used in making the present products in place of aniline. The present products tend to have lower melting points and solidification points; many of them are liquids. They also provide longer pot lives when blended into a polyurethane prepolymer.

The invention is based on the discovery that certain mixtures of an N-alkylaniline and 2-chloroaniline may be reacted with formaldehyde in the presence of an acid to provide mixtures of polyamines which are effective curing agents for polyurethanes and which display unexpected and valuable properties. Many of them are liquid; those which are not liquid have melting points lower than that of 4,4'-methylenebis-(2-chloroaniline) and show excellent supercooling properties.

As is well known, one means for curing polyurethanes is by the use of aromatic diamines. Generally in this method the diamine is added as a liquid to the liquid polyurethane to facilitate the blending operation. So that high temperatures are not necessary in this operation, it is advantageous that the diamine is a liquid, a low-melting solid, or a solid which when melted exhibits good supercooling properties. If the diamine solidifies before it is completely blended into the polymer or crystallizes from the blend, an improper cure will be obtained.

There has been a need for a diamine which has a lower melting point (lower solidification point) than that of the favored curing agent, 4,4'-methylenebis-(2-chloroaniline). Commercial samples of this diamine melt in the range 99°–109°C. The present condensation products fulfill this need.

As indicated, the invention is concerned with curing of polyurethanes, particularly isocyanate-terminated polyurethanes. Such polyurethanes are usually prepared by reacting an excess of an organic diisocyanate with a long-chain glycol. Generally the glycols used are polyether glycols or polyester glycols. The molar ratio of diisocyanate to glycol should be greater than one and is preferably large enough so that the polyurethane is liquid. Such polyurethanes are generally called prepolymers.

Curing agents for these prepolymers are compounds which contain more than one active hydrogen-containing group capable of adding to the isocyanate group. Glycols and diamines are such compounds. The plurality of the addition reactions results in chain extension. When a diamine is used as the curing agent chain extension is effected through formation of substituted urea linkages. By use of a deficiency of diamine, isocyanate groups remain. These react at curing temperature with active hydrogen-containing groups, e.g., urea and urethane groups, in the polymer chain to give branch points, biuret and allophanate linkages, respectively, which result in crosslinks. When a glycol is used as the curing agent, only urethane and allophanate groups are formed. See pp. 301–6, Polyurethanes: Chemistry and Technology. Part II. Technology by J. H. Saunders and K. C. Frisch, Interscience Publishers, 1964, for a description of the chemical reactions involved in the curing action.

The diamines are preferred over the glycols as curing agents since they react faster and thus have shorter cure times, and generally give better properties, such as higher tensile strength and higher hardness, after curing. Aromatic diamines are the most common, since most aliphatic diamines react too fast. A favored curing agent of this type is 4,4'-methylene-bis-(2-chloroaniline).

It is advantageous that the temperature of mixing of the diamine curing agent with the polyurethane is as low as possible, so the pot life of the mixture is as long as possible and the properties of the polymer are not affected. In commercial practice the diamine is usually mixed as a liquid with the liquid polyurethane so as to have quick, complete, and facile mixing. If the diamine is a solid, it is melted before mixing; the lower the solidification point, the lower the mixing temperature that can be used. The ideal diamine is one which is a liquid at ambient temperature.

There are some applications for which the conventionally used 4,4'-methylenebis-(2-chloroaniline) melts high. The melted material has to be kept at an undesirably high temperature to remain liquid for extended periods, and when added to the polyurethane, which is at a lower temperature, tends to solidify before it is completely blended into the polymer or to crystallize from the blend. Such premature solidification of the diamine results in polymer-diamine mixes which do not cure properly.

The present invention is based on the discovery that certain mixtures of an N-alkylaniline and 2-chloroaniline may be reacted with formaldehyde in the presence of an acid to provide new and useful compositions which are effective curing agents for polyurethanes. The new compositions display unexpected and valuable properties, in comparison to heretofore available diamine curing agents. Many of them are liquid; those which are not liquid have melting points lower than that of 4,4'-methylenebis(2-chloroaniline) and show excellent supercooling properties. When a solid composition of the invention is heated to a temperature at which it is liquid, it can thereafter be cooled to a temperature much lower than the temperature at which it was melted, without tending to resolidify readily. These properties permit the ready blending of the curing agents of this invention with a polyurethane without excessively heating the blend to prevent solidification of the curing agent. Of the products of this invention prepared the highest solidification temperature is 62°C. Commercial samples of the conventional 4,4'-methylenebis(2-chloroaniline), in contrast, resolidify in the range 85°-99° C.; they melt in the range 99°-109°C.

Another outstanding advantage of the new curing agents is that they have longer pot lives than 4,4'-methylenebis-(2-chloroaniline). The pot life is dependent upon the N-alkylaniline used and also on the ratio of reactants. The lower the processing temperature, the longer the pot life; because the curing agents of this invention permit lower processing temperatures, blends of them with a polyurethane may exhibit even longer pot lives. Because the present curing agents are liquid or have low solidification points there is no or less likelihood that they will solidify in and plug up the lines carrying them to the mixer.

Another advantage of the new curing agents is that using the same polyurethane the properties of the cured polymer can be varied by selecting the proper curing agent. For example, softer cured stocks can be obtained by using curing agents produced from mixtures of N-alkylaniline and 2-chloroaniline increasingly richer in N-alkylaniline.

The preferred compositions having useful curing activity and either being liquid or showing good supercooling properties are those prepared by condensing formaldehyde, or formaldehyde-generating reagent, in the presence of an acid with mixtures of an N-alkylaniline and 2-chloroaniline in which the molar ratio of N-alkylaniline to 2-chloroaniline is in the range 3:1 to 1:9. Condensation products from mixtures richer in N-alkylaniline do not have good curing activity while products from mixtures richer in 2-chloroaniline have solidification points approaching that of 4,4'-methylenebis-(2-chloroaniline).

The N-alkyl group, R in I and II, of the N-alkylaniline used to prepare these compositions is a primary or secondary alkyl group having one to eight carbon atoms. Illustrative examples are methyl, ethyl, n-propyl, isopropyl, n-butyl, isobutyl, sec-butyl, n-hexyl, and 2-octyl.

The amount of formaldehyde, or formaldehyde-generating reagent, used should be such that the molar ratio of the sum of the two amines to formaldehyde is at least about 1.5:1, that is, about 1.5:1 or higher (e.g., 4:1, 5:1, 10:1, or more). Any unreacted monoamines are removed from the condensation products by vacuum or steam distillation.

The condensations are carried out in inert solvents. Water is preferred, but organic solvents such as the lower alcohols (e.g., methanol, ethanol, and isopropanol) are also suitable, as well as ethers, lower aliphatic acids, aromatic hydrocarbons, etc.

The condensation is promoted by acids; it is preferred to use one of the strong mineral acids such as hydrochloric or sulfuric, but other inorganic or organic acids may be used, such as phosphoric, p-toluenesulfonic, oxalic, dichloroacetic, and trichloroacetic. It is preferred to use about one equivalent of acid per mole of total amines; however, this is not necessary. The useful amounts of acid are usually in the range from 0.5 to 2 equivalents per mole of total amines, but 0.1 to 10 equivalents may be used.

The condensations are best carried out at moderately increased temperatures; the preferred temperature range is 50°-100°C., although lower and higher temperatures may be used (e.g., 20°-150°C.).

Some of the compositions have been examined by gas-liquid chromatography, which shows the presence of three characterized components, 4,4'-methylenebis-(N-alkylaniline) (I), 2-chloro-N'-alkyl-4,4'-methylenedianiline (II), and 4,4'-methylenebis-(2-chloroaniline) (III). The presence of

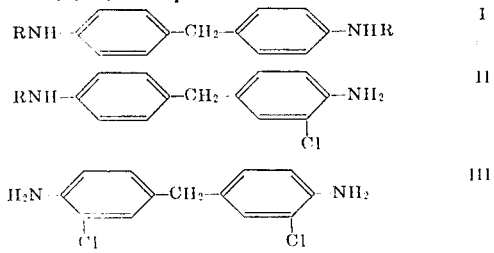

small amounts of other components, probably isomers of I, II, and III, is also shown. Distillation of the diamines in these compositions under reduced pressure leaves a residue which is obviously a complex mixture of higher polyamines, e.g., triamines, tetramines, etc. The amount of this mixture of higher polyamines present is dependent primarily upon the molar ratio of the sum of the N-alkylaniline and 2-chloroaniline to formaldehyde used; the smaller the ratio, the greater the amount of polymeric residue.

EXAMPLE I

The preparation of one of the curing agents of this invention, in which the N-alkylaniline used is N-isopropylaniline and the molar ratio of it to 2-chloroaniline is 2:1 and the molar ratio of their sum to formaldehyde is 4:1, is given as an example:

To a stirred solution of 90.0 grams (0.67 mole) of N-isopropylaniline, 42.5 grams (0.33 mole) of 2-chloroaniline, and 83.3 ml. (1.0 mole) of concentrated hydrochloric acid in 250 ml. of water at 60°C. was added 20.3 grams (0.25 mole) of 37 percent formaldehyde during 45 minutes. The stirred solution was then heated at 60°C. for 4 hours; 70 grams of 28-30 percent ammonia was added and the organic layer separated and subjected to steam distillation to remove excess monoamines. The organic residue was washed with hot water and dried under reduced pressure in a rotary evaporator on a steam bath to give 56.0 grams of brown oil. This oil showed no signs of crystallization, even after seeding with 4,4'-methylenebis-(2-chloroaniline) and standing for one year.

Examination of this product by vacuum distillation and gas-liquid chromatography showed it to consist of approximately 8 percent 4,4'-methylenebis-(N-isopropylaniline), 32 percent 2-chloro-N'-isopropyl-4,4'-methylenedianiline, 37 percent 4,4'-methylenebis-(2-chloroaniline), and 23 percent of mixed higher polyamines.

The presence of the 2-chloro-N'-alkyl-4,4'-methylenedianilines in these compositions was established by isolation and characterization in one instance. Fifteen grams of the product obtained by condensing 1 mole of N-methylaniline, 1 mole of 2-chloroaniline, and 0.5 mole of formaldehyde in the presence of 2 moles of hydrochloric acid was dissolved in 50 ml. of chloroform. This solution was chromatographed on an alumina column using chloroform as eluant liquid. Sixteen 125-ml. fractions were collected and the chloroform evaporated. On the basis of their infrared spectra, the first three fractions were principally 4,4'-methylenebis-(N-methylaniline); the fourth through the ninth fractions showed typical mixed primary amine-secondary amine infrared absorption; the thirteenth through the sixteenth fractions, on the basis of melting points and infrared spectra, were 4,4'-methylenebis-(2-chloroaniline). The fourth through the ninth fractions were combined and rechromatographed twice. The fractions having identical infrared spectra were combined to give 2.0 grams of an oil having a boiling point of 216°–218°C. (2.0 mm.). The elemental analysis and infrared spectrum confirm it to be 2-chloro-N'-methyl-4,4'-methylenedianiline.

Calculated for $C_{14}H_{15}ClN_2$: C, 68.16; H, 6.09; Cl, 14.40; N, 11.36. Found: C, 68.44; H, 6.28; Cl, 14.59; N, 11.14.

The presence of this liquid component contributes to the good supercooling or liquid properties of the compositions prepared using N-methylaniline as the N-alkylaniline. The presence of the 2-chloro-N'-alkyl-4,4'-methylenedianilines in the other compositions, then, plays a role in determining their supercooling or liquid properties.

EXAMPLE II

This example illustrates the manner of use of the mixed polyamines of the invention as curing agents for a liquid isocyanate-terminated polyurethane prepolymer prepared by adding 351.2 grams of 2,4-tolylene diisocyanate to 1,000 grams of poly(oxytetramethylene) glycol (number-average molecular weight 1,000) agitated at 40°C. and protected from atmospheric moisture. The mixture was then heated at 80°C. for 2 hours. The prepolymer obtained had an equivalent weight of 660.

A series of curing agents of the invention was prepared, using the procedure of Example I, and employing, as shown in Table I, various N-alkylanilines, various molar ratios of N-alkylaniline to 2-chloroaniline, A:C, and various molar ratios of total amines to formaldehyde, $(A + C):H_2CO$. Table I also gives the melting (clearing) point, solidification temperature, and chlorine content. The equivalent weight (weight containing 1 mole of amino groups) of the mixture of polyamines is calculated from its chlorine content using the expression $$E_R \left[ \frac{P(133.5 - E_R)}{3550 - P(133.5 - E_R)} + 1 \right]$$

in which $E_R$ is the equivalent weight of the 4,4'-methylene-bis(N-alkylaniline) constituent and P is the percent chlorine.

To evaluate the curing agents, they are weighed out in quantities to provide 0.9 equivalent of amine per isocyanate equivalent using 100 grams of prepolymer. For example, the condensation product prepared using a 2:1 molar ratio of N-isopropylaniline to 2-chloroaniline and a 4:1 molar ratio of the sum of the two amines to formaldehyde has a chlorine content of 15.82 percent and a calculated equivalent weight of 136; 18.5 grams of this product is used to cure 100 grams of the prepolymer. The curing agents are heated to 100°C. and blended with the prepolymer also heated to 100°C. After centrifuging for one minute, 80 grams of the blend is poured into a mold 7 × 7 × 0.075 inches and press-cured at 100°C. for one hour. The cured sheets are removed and post-cured for 16 hours at 70°C. The remainder of the blend is kept in an oven at 100°C. and the elapsed time from mixing until the blend becomes unpourable observed; this is the pot life. Physical properties of the cured elastomeric sheets are determined; these are shown in Table I. The properties of the stock cured with 4,4'-methylenebis(2-chloroaniline) are also given.

The data in Table I show that all of the compositions of the invention are either liquid, or have melting (clearing) points and solidification points lower than

TABLE 1

| Alkyl group | Molar ratio A:C | Molar ratio (A+C): H₂CO | Melting point, °C.[1] | Solidification point, °C.[2] | Chlorine analysis, percent | Pot life at 100°C., min. | Tensile strength, p.s.i. | Elongation, percent | 300% modulus, p.s.i. | Hardness Shore A/D | Split Tear ASTM D-470 p.l.i. |
|---|---|---|---|---|---|---|---|---|---|---|---|
| Methyl | 1:9 | 4:1 | 95 | 62 | 21.80 | 12 | 6,160 | 340 | 1,690 | 86/39 | 70 |
| Do | 1:3 | 4:1 | 75 | 38 | 20.28 | 12 | 6,120 | 350 | 3,280 | 80/31 | 70 |
| Do | 1:3 | 2:1 | 77 | 25 | 20.31 | 11 | 5,720 | 330 | 4,000 | 82/35 | 60 |
| Do | 1:1 | 1:1 | 18 | 25 | 14.47 | 11 | 4,570 | 380 | 1,560 | 75/28 | 60 |
| Do | 3:1 | 4:1 | Oil | | 8.48 | 12 | 3,330 | 380 | 1,120 | 70/22 | 10 |
| Isopropyl | 1:3 | 1:1 | 95 | 10 | 23.60 | 11 | 6,730 | 400 | 3,470 | 85/31 | 115 |
| Do | 1:1 | 1:1 | 75 | 25 | 18.62 | 16 | 5,800 | 370 | 2,930 | 78/30 | 50 |
| Do | 2:1 | 1:1 | Oil | | 15.82 | 25 | 1,910 | 310 | 3,060 | 81/31 | 60 |
| Do | 2:1 | 6:1 | Oil | | 17.13 | 20 | 3,760 | 320 | 3,040 | 71/29 | 50 |
| n-Propyl | 1:1 | 4:1 | Oil | | 14.06 | 17 | 1,130 | 360 | 1,690 | 73/29 | 40 |
| n-Hexyl | 1:1 | 4:1 | Oil | | 9.16 | 45 | 2,700 | 130 | 640 | 68/25 | 30 |
| 2-Octyl | 1:1 | 4:1 | 78 | 28 | 13.30 | 23 | 4,480 | 370 | 1,590 | 76/27 | 50 |
| 4,4'-methylenebis(2-chloroaniline) technical | | | 99 | 109 | 85-99 | 6 | 6,290 | 370 | 4,080 | 95/50 | 110 |

[1] This is the temperature at which the melt clears.
[2] With agitation by scratching.

that of technical 4,4'-methylenebis-(2-chloroaniline). They also have pot lives longer than that of this commonly used polyurethane curing agent. The data also show that there is in general a progressive change in the properties of the polyurethane cured with compositions of this invention derived from the same N-alkylaniline; keeping the molar ratio of the sum of the two amines to formaldehyde constant, the property is dependent upon the molar ratio of N-alkylaniline to 2-chloroaniline used. This is demonstrated in the series in which N-methylaniline is used as the N-alkylaniline: as the A:C molar ratio is increased, using an (A+C):H$_2$CO molar ratio of 4:1, the tensile strength, 300 percent modulus, hardness, and tear strength decrease. Advantage can be taken of this observation; using the same polyurethane, cured properties can be varied as desired by the choice of the proper curing agents of this invention. This is of unusual value when one considers the range of practical applications in which polyurethanes are currently used, these applications being dependent upon some specified property, such as hardness.

U. S. Pat. No. 3,194,793 discloses as a polyether polyurethane curing agent a mixture of (1) at least one aromatic primary diamine, and (2) at least one aromatic secondary diamine whose secondary amino groups have one valence of each nitrogen atom attached to an aromatic ring and another valence attached to an aliphatic carbon atom, the molar ratio of (1) to (2) ranging from about 0.33:1 to 5.7:1; a composition of the disclosure is an equimolar mixture of 4,4'-methylenebis-(2-chloroaniline) and 4,4'-methylenebis-(N-methylaniline). This mixture has been prepared and compared with the composition of the present invention prepared by reacting 1 mole of formaldehyde with 2 moles of N-methylaniline and 2 moles of 2-chloroaniline in the presence of 4 moles of hydrochloric acid. As curing agents for polyurethanes tested according to the procedure of Example II these compositions gave about the same properties and had the same pot life at 100°C. However, the composition of this invention has advantages in physical properties. It has a lower melting point, 48°C. against 81°C. Many days are required at 25°C. for it to partially solidify, while the mixture of the prior art solidifies quite rapidly at 40°C. Thus there is much less likelihood of my composition solidifying during processing.

It will be understood that the invention is applicable to the curing of conventional polyurethane prepolymers in general. As is well known to those skilled in the art such materials are produced from an organic compound rich in hydroxy groups, usually a polymer having at least two terminal hydroxy groups, frequently a polyether or polyester, and an organic polyisocyanate, usually a diisocyanate. The polymer used for reaction with the polyisocyanate to make the polyurethane is frequently a polyether or polyester glycol having a molecular weight of from 400 to 6,000, preferably in the 1,000–2,000 range. Mention may be made of chain extended polyesters made from a glycol (e.g., ethylene and/or propylene glycol) and a saturated dicarboxylic acid (e.g., adipic acid). Usually the starting glycol contains from two to 20 carbon atoms and the acid contains from four to 12 carbon atoms. Poly(ethylene adipate), poly(ethylene adipate-phthalate), poly(neopentyl sebacate), etc. may be mentioned. Small amounts of triols such as trimethylolpropane or trimethylolethane may be included. Examples of polyether glycols are poly(oxypropylene) glycol, poly(oxypropylene-oxyethylene) glycol, and poly(oxytetramethylene) glycol. Among the suitable polyisocyanates may be mentioned 2, 4-tolylene diisocyanate, 80/20 and 65/35 mixtures of 2,4- and 2,6-tolylene diisocyanates, 4,4'-diphenylmethane diisocyanate, 4,4'-biphenyl diisocyanate, 3,3'-dimethyl (or dimethoxy)-4,4'-biphenyl diisocyanate, 1,5-naphthalene diisocyanate, m- and p-phenylene diisocyanates, 1,6-hexamethylene diisocyanate, etc. The isocyanate is of course used in amount at least equivalent to the hydroxy groups in the starting polymer; larger quantities of diisocyanate favor formation of liquid prepolymer. Generally the molar ratio of diisocyanate to glycol is in the 1.2:1 to 3:1 range. For additional examples of suitable starting materials for making polyurethanes, reference may be had to the following: Otto Bayer in Angewandte Chemie, A59, 257 (1947) and U.S. Pat. No. 3,105,062, Graham and Gregg, Sept. 24, 1963. It will be understood that the present compositions may be used in the same proportions and under the same curing conditions as conventional diamine curing agents. Almost invariably the proportions of curing agent to prepolymer are such as to provide from about 0.5 to about 1.1 equivalents of amine per isocyanate equivalent in the prepolymer. The curing agent in the molten state is blended with the liquid prepolymer and is then shaped, for example, cast, molded, spread on cloth or otherwise used to coat and/or impregnate. While in the desired shape the mixture is heated to expedite cure, for example, to a temperature of 50°–250°C. for ½–48 hours (time and temperature of cure being generally inversely related) depending on such factors as the particular prepolymer used, the amount of curing agent, the degree of cure desired, the size of the article, the character of the heating device, etc. It will be understood that the curing conditions are not critical, but simply follow conventional practice. The curing agent may be employed according to the so-called "green stock" technique, for example, by mixing the curing agent and polyurethane and partially reacting them to a gelled, but incompletely cured, stage; the resulting solid gum (green stock) can subsequently be molded in a desired shape and cured at elevated temperature to a thermoset, cross-linked state. Useful articles of all sorts, such as gears, wheels, drive belts, conveyor belts, printing rollers, bearings, pump stators and impellers, heel lifts, gaskets, seals and electric cable jacketing, may be made using the curing agents of the invention.

Having thus described my invention what I claim and desire to protect by Letters Patent is:

1. The composition obtained by heating at curing temperature the blend of an isocyanate-terminated polyurethane prepolymer with a mixture of polyamines formed by the condensation in an inert solvent at a temperature of from 20° to 150° C. in the presence of an acid of formaldehyde with a mixture of an N-alkylaniline and 2-chloroaniline in which the molar ratio of N-alkyl-aniline to 2-chloroaniline is in the range 3:1 to 1:9, the molar ratio of the sum of the two amines to formaldehyde is at least about 1.5:1, and the amount of acid is from 0.1 to 10 equivalents per mole of total amines, the said alkyl group being primary or secondary and containing one to eight carbon atoms, the amount of said mixture being sufficient to provide from about 0.5 to about 1.1 equivalents of amine per isocyanate equivalent.

2. A composition as in claim 1 in which the N-alkylaniline is N-methylaniline.

3. A composition as in claim 1 in which the N-alkylaniline is N-ethylaniline.

4. A composition as in claim 1 in which the N-alkylaniline is N-isopropylaniline.

5. A composition as in claim 1 in which the said curing temperature is from 50° to 250°C., maintained for ½ to 48 hours.

* * * * *